Patented Dec. 29, 1936

2,065,762

UNITED STATES PATENT OFFICE 2,065,762

PRODUCTION OF FINELY DIVIDED MATERIAL

Edmund Stanley, Spondon, near Derby, England, assignor to Celanese Corporation of America, a corporation of Delaware No Drawing. Application January 28, 1932, Serial No. 589,538. In Great Britain February 3, 1931

5 Claims. (Cl. 83—94)

This invention relates to the production of finely divided material and more particularly to the production of finely divided dyestuffs and pigments.

For a large number of industrial purposes, substances are employed which it is essential should be in a very fine state of subdivision. Thus, for example, in order to produce artificial silk having a subdued lustre, there may be incorporated in the spinning solutions, from which the silk is to be spun, finely divided pigments such for example as finely divided titanium oxide, zinc oxide or other insoluble materials. It is absolutely essential that these materials should be exceedingly finely divided lest they should clog the filters through which the spinning solution passes before reaching the spinning jets, or should block the jets themselves. Again, in the dyeing industry, cellulose acetate artificial silk is commonly dyed or printed with insoluble dyestuffs in the form of aqueous suspensions or dispersions. It is very advantageous here that the dyestuff should be in a very fine state of subdivision in order that even and reasonably rapid dyeing of the materials may be obtained. In printing with such suspensions or dispersions, fine subdivisions of the dyestuff is even more important if even coloration of the printed parts is to be secured. There are many other branches of industry where the use is made of finely divided materials, e. g. the paint and lacquer industries.

The fine subdivision of substances, for example dyestuffs and pigments may be effected by dry-grinding, but more advantageously, especially when very fine subdivision is required, by grinding in a liquid medium, e. g. water, for example in a ball mill. In the latter case, however, it is frequently found that the paste of material and liquid exhibits a tendency to froth. We have observed that when such frothing occurs the rate of subdivision of the material is very much retarded.

In grinding or milling insoluble or difficultly soluble substances in liquid media in accordance with the present invention the subdivision of the material is facilitated by adding to the material a substance adapted to prevent frothing of the liquid or semi-liquid mass. In this manner reduction of the particle size to a given degree may be effected in a much shorter time than is otherwise possible. Of particular value for this purpose are liquids having a low surface tension relative to that of the water or other liquid medium. The added substance should preferably be such as will not adversely affect the materials under treatment or their subsequent application, or it may be easily removable from the product, for example it may be readily volatilized. As examples of substances which may be used for the purposes of the invention may be mentioned alcohols, such as methyl, ethyl and butyl alcohols, ethers, e. g. ethyl ether, many esters, e. g. ethyl acetate, ketones, for example acetone, and aromatic, hydro-aromatic or aliphatic hydrocarbons, such as benzene or paraffin oil. In general the amount of substance added need not be large, for example 5–15 per cent. e. g. 10 per cent. of methylated spirits may be added to an aqueous paste undergoing milling.

The dyestuff or other material may be ground, milled or the like in any convenient manner, for example in a ball or pebble mill. If desired, the milling or grinding may be carried out in the presence of additional abrasive materials, which may be water soluble to facilitate their removal from the finely divided material if such removal be desired. Examples of such abrasives are boric acid and sodium chloride. Thus, an insoluble dyestuff may be ground in a pebble mill with sodium chloride in the presence of a saturated solution of sodium chloride to which methylated spirits has been added to prevent frothing.

The mechanical disintegration of the insoluble or difficulty soluble substances by grinding, milling, or the like may further be carried out in the presence of substances which facilitate the fine subdivision of the materials or which tend to prevent agglomeration of fine particles, for example dispersing agents and/or protective colloids. Among dispersing agents which may be employed, the dispersing agents described in U. S. specifications Nos. 1,618,413, 1,618,414, 1,694,413, 1,690,481, 1,803,008, 1,716,721, and U. S. applications S. Nos. 134,138, filed 7th September, 1926, 390,423, filed 4th September, 1929, and 390,- 424, filed 4th September, 1929, may be mentioned. Other additions may likewise be made according to the purpose for which the finely divided material is to be employed. For example dyestuffs may be milled in the presence of thickening agents whereby there may be obtained pastes containing finely divided dyestuffs and directly applicable for the printing of textile materials. The invention is applicable to the fine subdivision of any desired insoluble or difficultly soluble materials and especially to the fine subdivision of insoluble or difficultly soluble coloring matter. Particular mention may be made of the insoluble or difficultly soluble azo, nitro-diarylamine, and amino anthraquinone dyes commonly used in the coloration of materials containing cellulose acetate or other cellulose esters or ethers.

In circumstances where the substance being milled or ground is afterwards to be employed in conjunction with a substance which is capable of preventing frothing it is convenient to employ that substance to prevent the frothing. Thus in grinding a pigment such for example as titanium oxide, which is to be incorporated in a solution of cellulose acetate in acetone subsequently to be spun into artificial filaments and the like, the substance added to the paste to prevent frothing may conveniently be acetone.

The following examples illustrate the invention without being in any way limitative:—

Example 1

50 lbs. of precipitated titanium oxide are ground in a pebble mill with 30 gals. of water to which are added 2 gals. of acetone. Particles of a fine degree of subdivision are obtained much more easily than in a similar grinding process in which the acetone is absent.

Example 2

100 lbs. of 1-oxy-4-amino-anthraquinone are made into a paste with 50 gals. of water containing 2 gals. of methylated spirits. 1 to 10 lbs. of a dispersing or wetting out agent, as for example Turkey red oil, are added and the mixture is then ground until a sufficiently fine dispersion results.

Example 3

25 lbs. of 1:4-dimethylaminoanthraquinone are mixed with 50 lbs. of common salt and made into a paste with 30 gals. of a saturated salt solution. 30 lbs. of methylated spirits are added and the paste is then ground in a pebble mill until a satisfactory dispersion results. If the grinding is performed without the addition of the salt and methylated spirits, the same degree of subdivision can only be achieved with difficulty by a much more prolonged milling.

What I claim and desire to secure by Letters Patent is:—

1. Process for effecting subdivision of substances selected from the group consisting of pigments and organic dyestuffs, which comprises milling said substances in an aqueous medium containing from 5 to 15% of a volatile compound soluble in the aqueous medium and selected from the group consisting of alcohols, ketones, and esters.

2. Process for effecting subdivision of substances selected from the group consisting of pigments and organic dyestuffs, which comprises milling said substances in an aqueous medium containing 10% of a volatile compound soluble in the aqueous medium and selected from the group consisting of alcohols, ketones and esters.

3. Process for effecting subdivision of substances selected from the group consisting of pigments and organic dyestuffs, which comprises milling said substances in an aqueous medium and in the presence of from 5 to 15% of a volatile organic liquid which is soluble in the aqueous medium.

4. Process for effecting subdivision of substances selected from the group consisting of pigments and organic dyestuffs, which comprises milling said substances in an aqueous medium and in the presence of 10% of a volatile organic liquid which is soluble in the aqueous medium.

5. Process for the production of finely divided titanium oxide which comprises grinding the titanium oxide in the presence of water containing a small proportion of acetone.

EDMUND STANLEY.